US012533777B2

(12) United States Patent
Simonin

(10) Patent No.: US 12,533,777 B2
(45) Date of Patent: Jan. 27, 2026

(54) MAGAZINE FOR A NAILING DEVICE, SUCH AS A PORTABLE NAILER AND NAILING DEVICE THEREFOR

(71) Applicant: Illinois Tool Works Inc., Glenview, IL (US)

(72) Inventor: Jean-Luc Simonin, Barcelonne (FR)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/724,525

(22) PCT Filed: Jan. 17, 2023

(86) PCT No.: PCT/US2023/060738

§ 371 (c)(1),
(2) Date: Jun. 26, 2024

(87) PCT Pub. No.: WO2023/141419

PCT Pub. Date: Jul. 27, 2023

(65) Prior Publication Data

US 2025/0222576 A1 Jul. 10, 2025

(30) Foreign Application Priority Data

Jan. 19, 2022 (FR) .................................... 2200430

(51) Int. Cl.
*B25C 1/00* (2006.01)

(52) U.S. Cl.
CPC .................................. *B25C 1/005* (2013.01)

(58) Field of Classification Search
CPC ......... B25C 1/001; B25C 1/003; B25C 1/005; B25C 5/1648; B25C 5/1655;
(Continued)

(56) References Cited

U.S. PATENT DOCUMENTS 2,740,119 A * 4/1956 Schafroth ................ B25C 5/06 227/108
3,189,220 A * 6/1965 Mullaney ................. B27F 7/38 221/176
(Continued)

FOREIGN PATENT DOCUMENTS

DE 10133988 C1 * 1/2003 ............... B25C 5/11
DE 202012004646 U1 * 7/2012 ........... B25C 5/1679
(Continued)

OTHER PUBLICATIONS

International Search Report and Written Opinion from International Application No. PCT/US2023/060738, mailed Jun. 19, 2023 (11 pages).

*Primary Examiner* — Joshua G Kotis
(74) *Attorney, Agent, or Firm* — Neal, Gerber & Eisenberg LLP

(57) ABSTRACT

A secondary magazine for a nailing device, such as a portable nailer, adapted to be connected to a main magazine of nails. More particularly, a main housing of the main magazine and a secondary housing of the secondary magazine respectively have a first longitudinal axis of symmetry and a second longitudinal axis of symmetry, transverse such as substantially perpendicular to each other; each magazine configured to house at least one nail of axis of symmetry; the nails of the main magazine being arranged in rows stacked along the first longitudinal axis of symmetry which is also transverse such as substantially perpendicular to the axis of the nail; the nails of the secondary magazine being arranged in rows stacked along the second axis of longitudinal symmetry.

21 Claims, 1 Drawing Sheet

(58) Field of Classification Search
CPC ... B25C 5/1662; B25C 5/1679; B25C 5/1682; B25C 5/1686
USPC .......................... 411/442–445; 227/136, 120
See application file for complete search history.

(56) References Cited

U.S. PATENT DOCUMENTS

| | | | | | |
|---|---|---|---|---|---|
| 3,191,802 | A * | 6/1965 | Lasting | B25C 3/004 | 221/290 |
| 3,238,983 | A * | 3/1966 | Abrahamsen | B25D 1/005 | 81/23 |
| 3,410,620 | A * | 11/1968 | Howard | B25C 1/003 | 312/73 |
| 3,437,249 | A * | 4/1969 | Baum | B25C 1/005 | 227/120 |
| 3,604,608 | A * | 9/1971 | Mullaney | B27F 7/38 | 227/120 |
| 3,707,406 | A * | 12/1972 | Perkins | B25C 1/003 | 227/114 |
| 4,139,136 | A | 2/1979 | Catalano | | |
| 4,151,944 | A * | 5/1979 | Picton | B27F 7/38 | 227/120 |
| 4,558,811 | A | 12/1985 | Klaus | | |
| 5,415,318 | A * | 5/1995 | Lewis | B25C 5/1634 | 221/268 |
| 5,522,533 | A * | 6/1996 | Mukoyama | B25C 5/1658 | 227/127 |
| 2010/0051666 | A1* | 3/2010 | Shkolnikov | B25C 5/1682 | 227/126 |
| 2010/0206935 | A1* | 8/2010 | Kuechler | B25C 1/005 | 227/136 |
| 2013/0026205 | A1* | 1/2013 | Lat | B25C 7/00 | 411/444 |

FOREIGN PATENT DOCUMENTS

| | | | | |
|---|---|---|---|---|
| EP | 1188522 | A2 | 3/2002 | |
| FR | 2554751 | A1 * | 5/1985 | B25C 1/04 |
| JP | 2000326257 | A * | 11/2000 | |
| JP | 3536711 | B2 * | 6/2004 | |

* cited by examiner

MAGAZINE FOR A NAILING DEVICE, SUCH AS A PORTABLE NAILER AND NAILING DEVICE THEREFOR

PRIORITY

This application is a national stage application of PCT/US2023/060738, filed on Jan. 17, 2023, which claims priority to and the benefit of French Patent Application No. 2200430, filed Jan. 19, 2022, the entire contents of each of which are incorporated herein by reference.

TECHNICAL SCOPE

The present disclosure relates to an electroportable device. More specifically, the present disclosure relates to an electroportable device of the nailer or screwdriver type for driving nails into a support, and more particularly to a magazine for electroportable nailer. In one embodiment, the device is applicable to pneumatic and corded tools.

BACKGROUND

Power tools, such as a nailer, are well known field, especially plasterers or electricians.

During nailing operations, it is necessary for the operator to have a certain quantity of nails available in a nail magazine. However, these magazines are generally shaped to fit the tool and are therefore quite compact, taking up few nails.

The present disclosure aims to solve this problem.

SUMMARY

On the basis of the above-mentioned problems, various embodiments of the present disclosure relate to a secondary magazine for a nailing device, such as a portable nailer, adapted to be connected to a main magazine of nails, the main magazine and the secondary magazine having respectively a first axis of longitudinal symmetry and a second axis of longitudinal symmetry, transversely such as substantially perpendicular to each other each magazine being adapted to house at least one nail of axis of symmetry, the nails of the main magazine being arranged in rows stacked along the first axis of longitudinal symmetry which is also transverse such as substantially perpendicular to the axis of the nail, the nails of the secondary magazine being arranged in rows stacked along the second axis of longitudinal symmetry.

Thus, according to the various embodiments of the present disclosure, it is possible to store a greater number of nails while maintaining the compactness of the tool, by modifying the nail arrangement in the magazine.

Advantageously, in various embodiments, the first longitudinal axis of symmetry and the second longitudinal axis of symmetry form an angle substantially between 60° and 90°. This is to enable efficient loading of nails, especially large nails (e.g., 6 cm) from the secondary magazine to the main magazine.

Advantageously, in various embodiments, the secondary magazine comprises at least one mechanism for holding the nails in a housing of the secondary magazine.

In addition, the holding mechanism is made of an elastic material with a coefficient of elasticity of about 600%.

Also, in various embodiments, the holding mechanism is round in shape.

Furthermore, in various embodiments, the holding mechanism is a two-component silicone material.

Advantageously, in various embodiments, the secondary magazine comprises an opening for inserting the plurality of nails into the secondary magazine housing.

According to various embodiments of the present disclosure, the nails are assembled in the form of strips of nails, each strip comprising a plurality of nails, each strip being substantially identical in width to a width of the housing.

In one embodiment, the secondary magazine is made in one piece with the main magazine.

In various embodiments, the present disclosure also relates to a device for nailing at least one nail stored in a main magazine having a first axis of longitudinal symmetry, the nails being stored in rows stacked along the first axis of longitudinal symmetry which is further transverse such as substantially perpendicular to an axis of a nail, and further comprising a secondary magazine as described above and connected to the main magazine.

Also, in various embodiments of this device, at least one of the main magazine and the secondary magazine is removable.

In one embodiment, the secondary magazine and the main magazine of the nailing device are made in one piece.

Also, in various embodiments of this device, the main magazine comprises a cocking mechanism for cocking the nails housed in the main magazine.

For the avoidance of doubt, all features described herein apply equally to any aspect of the present disclosure.

In the context of the present application, it is expressly provided that the various aspects, embodiments, examples, and alternatives set forth in the preceding paragraphs, in the claims and/or in the following description and drawings, and in particular the individual features thereof, may be taken independently or in any combination. In other words, all embodiments and/or features of any embodiment may be combined in any manner, unless such features are incompatible.

For the avoidance of doubt, the terms “may”, “and/or”, “for example”, and any other similar terms used herein are to be construed as non-limiting, so that not every feature so described need be present. Indeed, any combination of optional features is expressly contemplated without departing from the scope of the present disclosure, whether or not they are expressly claimed. The applicant reserves the right to amend any originally filed claim or to file any new claim, accordingly, including the right to amend any originally filed claim to depend upon and/or incorporate any feature of any other claim although not originally claimed in that manner.

BRIEF DESCRIPTION OF THE FIGURES

Further features and advantages of the present disclosure will become apparent from the following detailed description, for the understanding of which reference is made to the attached drawings in which.

DETAILED DESCRIPTION

Various aspects of different embodiments according to the present disclosure are described in more detail below, with reference to the attached drawings.

Throughout the description and claims of this specification, the words “include” and “contain”, and variations thereof mean “including but not limited to” and are not intended to (and do not exclude) other parts, additives, components, integers, or steps. Throughout the description and claims of this specification, the singular includes the plural, unless the context otherwise requires. In particular, when the indefinite article is used, the specification should be understood to contemplate plurality as well as singularity, unless the context requires otherwise.

In various embodiments, the present disclosure relates to an electroportable device of the nailer or screwdriver type for driving nails into a support, and more particularly to a magazine for an electroportable nailer. In one embodiment, the device is applicable to pneumatic and corded tools.

In connection with FIG. 1, a particular embodiment according to the present disclosure, applied for an electroportable nailing device, will now be described.

Figure 1:
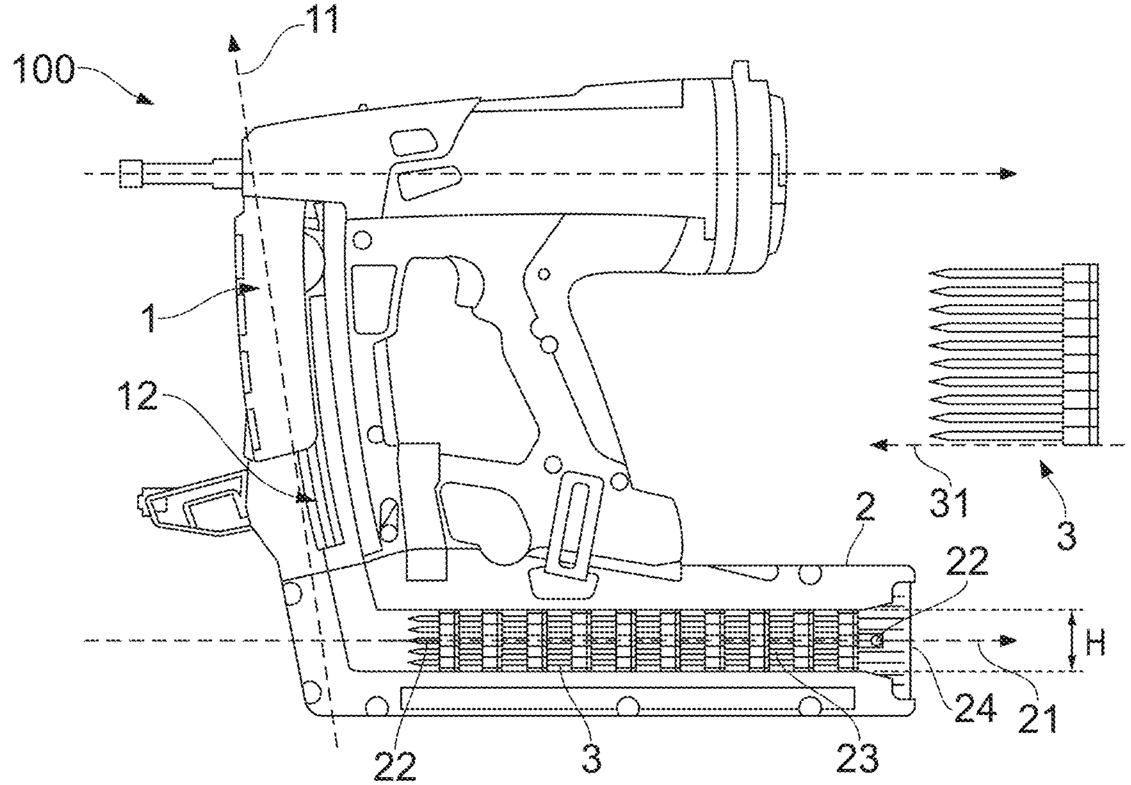
FIG. 1 schematically illustrates a nailer with its dedicated magazine according to a first embodiment.

FIG. 1 illustrates schematically a nailer with its dedicated magazine.

As previously introduced, in various embodiments, the present disclosure concerns a secondary magazine (2) for a nailing device, such as a portable nailer, adapted to be connected to a main magazine (1) of nails (3), the main magazine and the secondary magazine having respectively a first axis of longitudinal symmetry (11) and a second axis of longitudinal symmetry (21), transverse such as substantially perpendicular to one another.

Each magazine is adapted to house at least one nail (3) of axis of symmetry (31).

The nails in the main magazine (1) are arranged in rows stacked along the first axis of longitudinal symmetry which is also transverse such as substantially perpendicular to the axis (31) of the nail.

Also, the nails in the secondary magazine (2) are arranged in rows stacked along the second axis of longitudinal symmetry (21).

According to a characteristic, the first longitudinal axis of symmetry (11) and the second longitudinal axis of symmetry (21) form an angle substantially between 60° and 90°.

In addition, the secondary magazine comprises at least one nail holding mechanism (22) in a housing (23) of the secondary magazine (2).

Also, the holding mechanism is made of an elastic material having a coefficient of elasticity of about 600%.

For example, the holding mechanism is round in shape and made of a two-component silicone material.

The secondary magazine (2) also comprises an opening (24) for inserting the plurality of nails into the housing (23) of the secondary magazine (2).

According to various embodiments of the present disclosure, the nails are assembled in the form of strips of nails, each strip comprising a plurality of nails, each strip being substantially identical in width to a width (H) of the housing (23).

Figure 2:
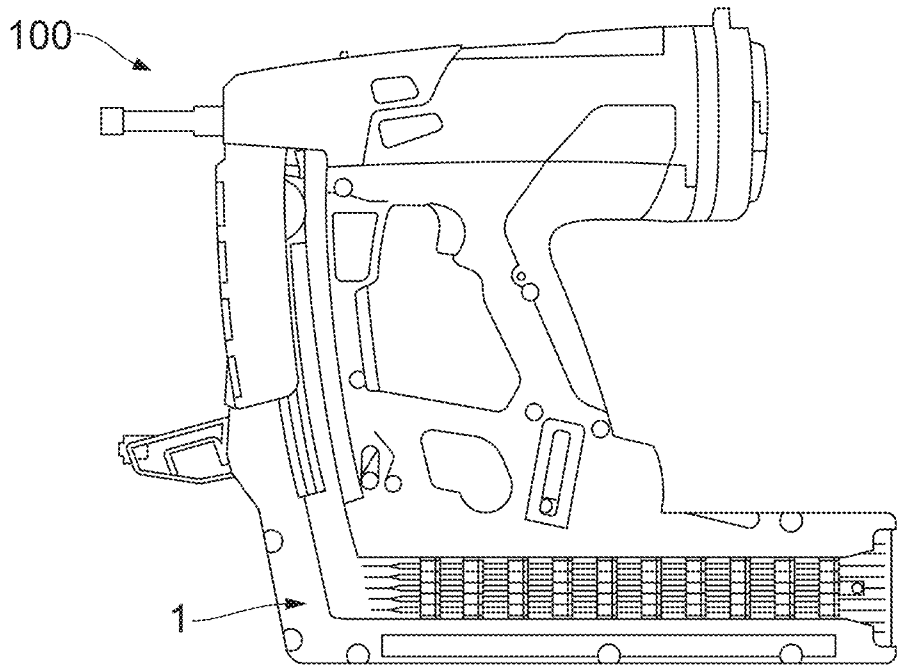
FIG. 2 shows schematically a nailer with its dedicated magazine according to a second embodiment.

According to a variant of FIG. 2, the secondary magazine is made in one piece with the main magazine thus forming a main magazine (1) of nails.

In various embodiments, the present disclosure also relates to a nailing device (100) for at least one nail (3) stored in a main magazine (1) having a first axis of longitudinal symmetry (11), the nails being stored in rows stacked along the first axis of longitudinal symmetry which is furthermore transverse such as substantially perpendicular to an axis (31) of a nail. In particular, it further comprises the secondary magazine (2) as described above and connected to the main magazine (1).

In this nailing device (100), at least one of the main magazine (1) and the secondary magazine (2) is removable, the main magazine (1) further comprising a cocking mechanism (12) for cocking the nails accommodated in the main magazine (1).

According to a variant as illustrated in FIG. 2, the secondary magazine and the main magazine as described above are made in a single monobloc part forming a single main magazine 1.

The invention claimed is:

1. A nailing device comprising:

a main magazine having a main housing having a first longitudinal axis of symmetry and configured to hold first nails each having an axis of symmetry such that the first nails are arranged in a row along the first longitudinal axis of symmetry that is transverse to the axis of symmetry of the first nails, a secondary magazine having a secondary housing having a second longitudinal axis of symmetry transverse to the first longitudinal axis of symmetry of the main housing of the main magazine, wherein the secondary housing defines a chamber configured to house second nails each having an axis of symmetry such that the second nails are arranged in a plurality of rows stacked along the second longitudinal axis of symmetry that is substantially parallel to the axis of symmetry of the second nails, wherein a shank of each of the second nails extends along the axis of symmetry of the respective second nail.

2. The nailing device of claim 1, wherein the first longitudinal axis of symmetry and the second longitudinal axis of symmetry form an angle substantially between 60° and 90°.

3. The nailing device claim 1, which includes a nail holding mechanism in the secondary housing of the secondary magazine.

4. The nailing device of claim 3, wherein the nail holding mechanism includes an elastic material.

5. The nailing device of claim 3, wherein the nail holding mechanism is round in shape.

6. The nailing device of claim 3, wherein the nail holding mechanism is formed from a two-component silicone material.

7. The nailing device of claim 1, wherein the secondary housing defines an opening configured to enable insertion of the second nails into the secondary housing.

8. The nailing device of claim 1, wherein the chamber of the secondary housing is configured to hold the second nails that are assembled in the form of strips of nails, each strip comprising a plurality of nails, each strip being substantially identical in width to a width of the chamber of the secondary housing.

9. The nailing device of claim 1, wherein the secondary magazine is integrally formed with the main magazine.

10. The nailing device of claim 1, wherein the secondary magazine is connectable to the main magazine.

11. A nailing device comprising:

a main magazine having a main housing having a first longitudinal axis of symmetry and configured to house first nails each having an axis of symmetry and such that the first nails are arranged in a row along the first longitudinal axis of symmetry that is transverse to the axis of symmetry of the first nails;

a secondary magazine having a secondary housing having a second longitudinal axis of symmetry transverse to the first longitudinal axis of symmetry of the main housing of the main magazine, the secondary housing configured to house second nails each having an axis of symmetry, and the secondary housing configured to house the second nails arranged in rows stacked along the second longitudinal axis of symmetry such that the second longitudinal axis of symmetry is substantially parallel to the axis of symmetry of the second nails, wherein a shank of each of the second nails extends along the axis of symmetry of the respective second nail;

a nail driving assembly supported by the main housing;

a nosepiece assembly supported by the main housing; and a trigger assembly supported by the main housing.

12. The nailing device of claim 11, wherein the first longitudinal axis of symmetry and the second longitudinal axis of symmetry form an angle substantially between 60° and 90°.

13. The nailing device of claim 11, which includes a nail holding mechanism in the secondary housing of the secondary magazine.

14. The nailing device of claim 13, wherein the nail holding mechanism includes an elastic material.

15. The nailing device of claim 13, wherein the nail holding mechanism is round in shape.

16. The nailing device of claim 13, wherein the nail holding mechanism is formed from a two-component silicone material.

17. The nailing device of claim 11, which defines an opening configured to enable insertion of the second nails into the secondary housing.

18. The nailing device of claim 17, wherein the secondary housing is configured to hold the second nails that are assembled in the form of strips of nails, each strip comprising a plurality of nails, each strip being substantially identical in width to a width of the opening of the secondary housing.

19. The nailing device of claim 11, wherein the secondary magazine is integrally formed with the main magazine.

20. The nailing device of claim 11, wherein the secondary magazine is connectable to the main magazine.

21. The nailing device of claim 11, wherein the main magazine includes a cocking mechanism configured to cock the first nails in the main magazine.

* * * * *